June 4, 1963
E. E. HEWITT
3,092,130
DIAPHRAGM DOUBLE CHECK VALVE DEVICE
Filed Dec. 23, 1960
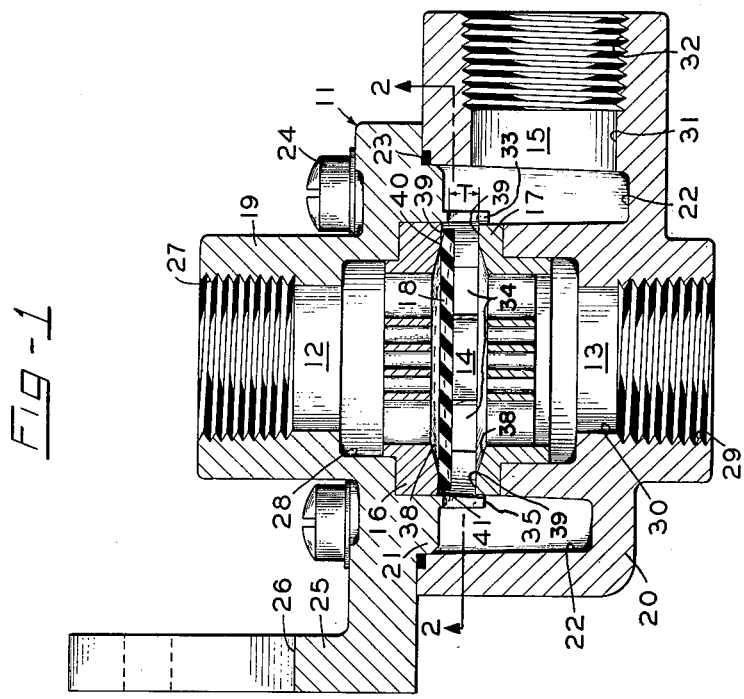
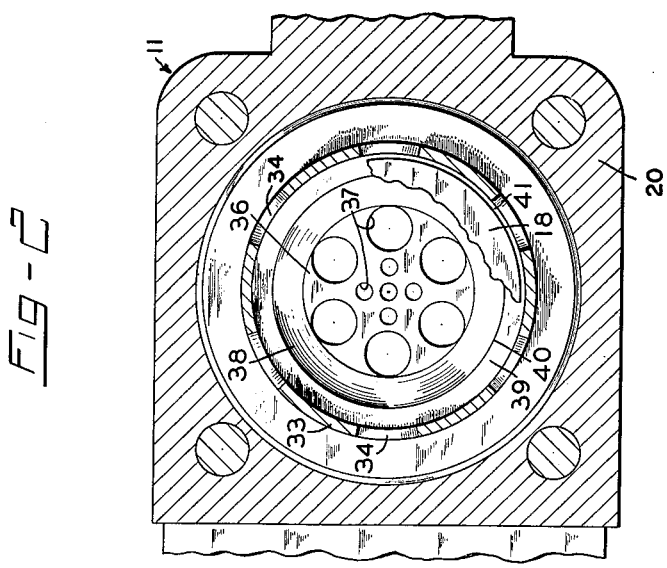
INVENTOR.
ELLIS E. HEWITT
BY *Fred P. Spatka*
ATTORNEY United States Patent Office 3,092,130
Patented June 4, 1963

3,092,130
DIAPHRAGM DOUBLE CHECK VALVE DEVICE
Ellis E. Hewitt, Ruffsdale, Pa., assignor to Westinghouse Air Brake Company, Wilmerding, Pa., a corporation of Pennsylvania
Filed Dec. 23, 1960, Ser. No. 78,155
8 Claims. (Cl. 137—112)

This invention relates to double-check valve devices employed in fluid pressure control systems for operating fluid actuator devices and, more particularly, to a double-check valve device of the type having a pressure responsive shuttle subject opposingly to fluid pressure from two different sources and movable in response to a pressure differential between the two sources selectively to control the release of fluid under pressure to the fluid actuator device from the source having the higher value and to simultaneously close off the fluid under pressure from the source of fluid under pressure at the lower value.

Double-check valves of the above type generally comprise a casing provided with a pair of inlets adapted to be connected to respective one of two pipes associated with two separate and different sources of fluid under pressure and an outlet adapted to be connected to the fluid actuated device. The casing is formed with a chamber communicating with each of the inlets and the outlet, and a pressure responsive member is disposed therein between the two inlets so that upon a pressure differential in the fluids between the inlets applied opposingly to the member the latter is shuttled to close off communication between the inlet connected to the source of fluid pressure having the lower value and to open communication between the supply outlet and inlet connected to the source of fluid pressure at the higher value.

Heretofore, double-check valves have been constructed so that the pressure differential required to move the pressure responsive member from one position to the other, that is, from one inlet to the other inlet, was of such a magnitude that the opening of the inlet connected to the source of fluid at the desired higher value was delayed. This delay resulted in a lower pressure at the outlet so that under some circumstances the fluid actuated device associated therewith was incapable of performing its intended function. Further difficulties have been encountered in effectively sealing the inlet connected to the lower value of fluid under pressure against leakage. With some of the prior structures, sealing of the low pressure inlet is ineffectively accomplished by the pressure differential required to move the shuttle or pressure responsive member from one inlet to the other inlet so that only higher differentials were operative to perform an effective sealing. During this period of leakage caused by the ineffective sealing of the shuttle member over its inlet, there was a corresponding decrease in the pressure build-up in the outlet or supply chamber of the valve device. This resulted in lower pressure being supplied to the fluid actuator device connected thereto for operation thereby.

It is a principal object of the invention to provide a new and improved double-check valve device overcoming the difficulties encountered heretofore and which is of simple construction and economical to manufacture.

In accordance with the present invention this is accomplished generally by the provision in a double-check valve casing having a shuttle chamber and a pair of spaced valve seat members associated with respective ones of the usual two inlets of a shuttle in the form of a lightweight, semi-rigid diaphragm having a surface capable of being depressed when contacting a sharp edge on the valve seats in the presence of a low differential of pressures between the source of fluid under pressure entering through the inlet means and applied opposingly to the diaphragm and being flexible to form a more firm surface seal on the valve seat upon prolonged application of the pressure differential.

More particularly, the present invention comprises a shuttle valve having a body provided with a pair of coaxial inlet means adapted to be connected to respective ones of control lines having different sources of fluid pressure, a fluid supply outlet means selectively communicable with each of said inlet means, a shuttle chamber communicating with each of the inlet means and said supply means, a pair of valve seat members, each of said valve seat members comprising an annular surface and an intersecting conical surface defining a sharp edge, and a semi-rigid and depressibly faced diaphragm floatingly disposed in the shuttle chamber so that in response to pressure differential between the two inlets the disc is substantially instantaneously movable between the valve seats on the respective inlets to positively seal the inlet connected to the lower source of pressure by initial contact with said valve seat sharp edge and upon continued application of an increasing pressure differential to flex and provide surface contact sealing with said conical surface thereby to cut off communication of the latter inlet with the supply outlet and opening communication of the inlet having the higher value of fluid under pressure with said supply means.

Other features and advantages of the invention will be apparent from the specification and claims when considered in connection with the drawings in which:

FIG. 1 is a sectional view of a double-check valve device constructed in accordance with the present invention.

FIG. 2 is a cross-sectional view taken substantially along the lines 2—2 of FIG. 1 with a portion of the diaphragm broken away to show underlying details of the valve seat member.

Referring now to the figures, the double-check valve of the present invention comprises generally a housing or casing 11 having axially aligned inlet means 12 and 13 adapted to be connected to different sources of fluid under pressure, a substantially centrally located shuttle chamber 14 communicable with the inlets 12 and 13, a supply outlet means 15, valve seat means 16 and 17 associated with the inlet means 12 and 13, respectively, and a fluid pressure responsive shuttle or diaphragm 18 for selectively closing off one of the inlet means 12 or 13 from communication with the shuttle chamber 14 and opening the other for communication supply outlet means 15.

The casing 11 comprises a cover member 19 and a body member 20 having a boss 21 and an annular chamber 22, respectively, so as to hold the inlet means 12 and 13 axially aligned. Interposed between the mating surfaces of the cover and body members 19 and 20 is a sealing gasket 23 and the former are fastened together by cap screws 24.

As shown, the cover member 19 is formed with a flange 25 having an opening 26 for accommodating a screw or other suitable fastening means for securing the casing 11 to a convenient supporting structure. The support of the casing may be advantageous in control systems where the change in direction of flow through the valve may cause vibration creating forces. However, where such vibration forces are not anticipated, the flange 25 may be omitted.

The inlet means 12 is formed with an internally threaded end 27 adapted to be connected to suitable piping leading to one source of fluid under pressure. The other end of the inlet means 12 is formed with an inlet chamber 28 which receives the valve seat means 16. The inlet means 13 is similarly formed with an internally threaded end portion 29 and inlet chamber 30 which receives the valve seat member 17. The internally threaded portion 29 is adapted to be connected to piping leading to a source of pressure different from that connected to the outlet means 12.

The annular chamber 22 forms part of the fluid supply outlet means 15 and defines a fluid supply chamber which communicates with a supply outlet 15 provided in the body member 20 and arranged normal to the axis of inlet means 13. The outer end of the supply outlet means 15 is formed with an internally threaded portion 32 adapted to be connected with the piping leading to the fluid actuated device (not shown), forming part of the control system in which the double-check valve device is adapted to be employed.

The shuttle valve chamber 14 includes a plurality of spaced circumferential fingers 33 projecting from the cover member 19. The fingers 33 are coaxial with the inlet means 12 and 13 and the spaces therebetween form passageways 34 so as to provide communication between the shuttle chamber 14 and the annular supply chamber 22. It is to be noted that the ends 35 of the fingers 33 extend into the fluid supply chamber 22 so as to overlie the valve seat member 17. In this manner the fingers 33 define the outer periphery of the shuttle chamber and provide means for guiding the shuttle for movement therein, as more fully to be explained hereinafter.

In the form shown the valve seat members 16 and 17 may be formed by die casting or the like and are force-fitted into their respective inlet chambers 28 and 30. Each of the valve seat members 16 and 17 is formed with a grill 36 having a plurality of circular fluid passages 37, an outwardly tapering passage defining a conical valve seat surface 38 which intersects with a flat annular surface 39 formed on the terminal end thereof so as to define a sharp circular edge 40. It is to be noted that the annular valve seat surfaces 39 formed on each of the valve seat means 16 and 17 are axially spaced from each other and determine the limits of travel T of the diaphragm or disc 18. While the valve seats 16 and 17 have been shown as separate elements, it is to be understood that the valve seats may be formed directly on body and cover members.

The diaphragm 18 is formed of a lightweight and air impervious material so as to be movable in response to a pressure differential between the fluid under pressure in the inlet chamber 28 and the fluid under pressure in the chamber 30 to a sealing position over the valve seat associated with the chamber having the lower value of pressure. In this manner one of the inlet chambers is rendered inoperative so as to be maintained out of communication with the shuttle chamber 14 and, accordingly, the supply chamber 22. The inlet chamber at the higher pressure is opened and the fluid under pressure therein communicates with the supply chamber 22 via the shuttle chamber 14 and the radial spaces 34 between the fingers 33.

To assure effective sealing of the inoperative inlet in the presence of low pressure differential between the inlet chambers 28 and 30, the material from which the diaphragm 18 is constructed is selected so as to have surface hardness characteristics capable of being depressed into the sharp edge 40 of the valve seat member. Satisfactory results have been achieved with surfaces having a Durometer hardness ranging between about 40 to 80 so that the sharp edge 40 was depressed in the surface to form a seal.

As a further factor, the thickness of the diaphragm 18 is selected so as to provide the maximum rigidity under low pressure differentials applied thereto during shuttling from one seat to the other while at the same time permitting bending or flexing thereof when contacting the valve seat members as the pressure differential increases so that the diaphragm 18 is in firm surface sealing engagement with the conical surfaces 38.

Materials found to have the desired characteristics and fulfilling the above requirements are rubber, impregnated leather, and various types of plastics, such as, urethane. It should also be mentioned that the thickness of the diaphragm may be influenced by the tensile strength required to withstand the maximum operating pressure supplied to the diaphragms without breakdown. Thicknesses found to be satisfactory when the above-mentioned materials are employed range between about $\frac{1}{64}''$ to $\frac{1}{8}''$.

In one specific application wherein the maximum pressure application on the diaphragm 18 ranged between 200 to 250 lbs. p.s.i., it was found that an impregnated leather diaphragm having a surface with an average Durometer hardness of approximately 60 and a thickness of about $\frac{3}{32}$ of an inch produced satisfactory results so that the sharp edge 32 was depressed into the surface to provide an effective seal under a pressure differential as low as 1 p.s.i.g. and when maximum pressure was applied, the diaphragm 18 flexed into sealing contact with the conical surface 39.

To initiate movement of the diaphragm under pressure differential conditions as low as 1 lb. p.s.i., a definite relationship is maintained (1) between the diameter of the diaphragm 18 and the diameter of the shuttle chamber 14, and, (2) between the length of travel T of the diaphragm and the rate of flow of the fluid under pressure through the openings 37 of the grill 36 and the rate of flow past the diaphragm 18 and the passageways 34 into the supply chamber 22.

To this end, the diameter of the diaphragm 18 is maintained less than the diameter of the shuttle chamber 14 defined by the fingers 33 so as to define an annular clearance space 41 having an area less than 25% of the cross-sectional area of the chamber 14. This clearance is adequate to permit floating action of the diaphragm between the inlets, while at the same time presenting a large pressure responsive face of the diaphragm in the path of the flow of the fluid under pressure so that in the presence of low differentials of pressure of the fluids entering through the inlets the total force on face is operative to quickly shuttle the diaphragm. The total travel T of the diaphragm between the valve seats is determined so that when the diaphragm 18 is at ½ the distance between the valve seats 16 and 17 the total area of the supply passageways 34 and the annular clearance space 41 through which the fluid under pressure having the higher value flows into the supply chamber 22 is less than 75% of the total area of the openings 37 in the grill 36 through which the fluid enters the chamber 14 from the inlet chamber. In this manner the flow of the fluid under pressure from the chamber 14 into the supply chamber 22 is restricted so as to assure that the pressure differential between the fluids entering the chamber 14 through the inlet means 12 and 13 is maintained on the opposite faces of the diaphragm 18 to effectively shuttle the diaphragm at the low pressure differential.

*Operation*

Assuming the several parts of the valve device to be in the position shown and the inlet means 12 and 13 connected to separate and different sources of fluid under pressure and the supply outlet connected to fluid actuated device. In this position the fluid under pressure in the inlet chamber 28 is of a lower value than the fluid under pressure in the inlet chamber 30.

Under these conditions the pressure differential on the opposite faces of the diaphragm 18 is operative to hold the latter flexed in the position shown by the dotted lines in surface sealing engagement with the conical valve seat surface 38 of the valve seat. The grill 36, of course, prevents the diaphragm 18 from entering the inlet chamber 30.

The fluid under pressure from the inlet chamber 30 flows through the openings 37 in the grill 36 and through the radial passageways 34 into the supply chamber 22 and thence to the fluid actuated device connected to outlet 15.

Assuming that the source of fluid under pressure in the inlet chamber 28 increases above a value required to operate the fluid actuated device and that fluid under pressure is at the required value of pressure, this condition creates a pressure differential on the opposite faces of the diaphragm 18.

With the diaphragm 18 of the present invention, a pressure differential as low as 1 p.s.i. between the inlet chambers 28 and 30 is operative to unseat the diaphragm 18 and shuttle it to seating engagement with the opposite seat. Under the latter condition assumed above, the diaphragm 18 on the seat 38 initially unflexes and is substantially instantaneously shuttled in its unflexed state through the length of travel T to seat upon the flat annular surface 39 of valve seat 17 with the sharp circular edge 40 depressed in surface of the diaphragm so as to effectively seal the inlet chamber 30. It is to be observed that the diaphragm is sized so that it is out of engagement with the fingers 33 and no frictional forces are present to impede the shuttling thereof between the inlets. The fluid under pressure from inlet 28 flows through the grill 36 and through radial passageways 34 into the supply chamber 22 and thence to the fluid actuated device connected to outlet 15.

As the pressure of the fluid in the inlet chamber 28 further increases and the pressure of the fluid entering the shuttle chamber 14 correspondingly increases so that the pressure differential increases, the diaphragm flexes and bends inwardly toward the grill 36 so as to conform to the shape of the conical surface 38 on valve seat 17. In this manner the seal is formed between the contacting surfaces of the diaphragm and the conical surface 38 of the valve seat 17.

The converse action takes place when the pressure relationship between the inlet chambers 28 and 30 is reversed.

Having now described the invention, what I claim as new and desire to secure by Letters Patent, is:

1. A double-check valve device for cutting off communication of one of two different sources of fluid under pressure upon a decrease in pressure of one of said sources relative to said pressure of the other of said sources comprising a casing formed with a cylindrical shuttle chamber of substantially constant diameter along its length, a pair of inlet port means disposed on opposite sides of and axially aligned with said chamber, a fluid supply outlet means communicating with said chamber, valve seat means provided on each of said inlet means communicating with said chamber, each of said valve seat means including a conical surface and an intersecting annular flat seat surface arranged normal to the axis of said conical surface to form a sharp circular edge, a flexible diaphragm having surface characteristics capable of being depressed by said sharp edge and having a lesser diameter than said chamber and greater than said sharp circular edge, said diaphragm being floatingly movable between said valve seats upon a pressure differential between the fluids in said inlet means and to initially seat on said flat annular surface associated with the source of fluid having the lower value of pressure with said sharp edge depressed in said surface and subsequently flexed to form a surface contacting seal with said conical surface so as to cut off communication of said one inlet means with said supply outlet means.

2. A double-check valve device for cutting off communication of one of two different sources of fluid under pressure upon a decrease in pressure of one said source relative to the pressure of the other of said sources comprising a casing formed with a cylindrical shuttle chamber of substantially constant diameter along its length, a pair of fluid inlet means disposed on opposite sides of and axially aligned with said chamber, a fluid supply outlet means communicating with said chamber, valve seat means provided on each of said inlet means communicating with said chamber and including an annular valve seat of which the inner periphery forms a sharp edge, a semi-rigid diaphragm having a surface capable of being depressed by said sharp edge and having a lesser diameter than said chamber and greater than said inner peripheral edge, said diaphragm being movable between said valve seats upon a pressure differential between the fluids in inlet means and to seat on said flat annular seat surface associated with the source of fluid having the lower value of pressure with said sharp edge depressed in the surface thereof so as to cut off communication of said one inlet means with said supply outlet means.

3. A double-check valve device for cutting off communication of one of two different sources of fluid under pressure upon a decrease in pressure of one of said sources relative to the pressure of the other of said sources comprising a casing including a cylindrical shuttle chamber having a periphery formed by a plurality of circumferential fingers radially spaced from each other so as to define passageways, a pair of fluid inlet chambers disposed on opposite sides of and axially aligned with said chamber, a fluid supply outlet means communicating with said chamber through said passageway, valve seat means provided on each of said inlet chambers adjacent said chamber, each of said valve seat devices comprising a conical surface and an intersecting annular flat seat surface arranged normal to the axis of said conical surface forming a sharp circular edge, a semi-rigid diaphragm having surface characteristics capable of being depressed by said sharp edge and having a lesser diameter than said chamber and greater than said inner edge, said diaphragm being floatingly movable between said valve seats upon a pressure differential between the fluids in said inlet chambers and to initially seat on said flat annular surface associated with the source of fluid having the lower value of pressure with said sharp edge depressed in said surface and subsequently to flex to form a surface contacting seat with said conical surface so as to cut off communication of said one inlet means with said supply outlet means.

4. The invention as defined in claim 3, in which diameter of said diaphragm is related to the diameter of said shuttle chamber to define an annular clearance having an area less than the 25% of the total cross-sectional area of said chamber.

5. The invention as defined in claim 4, in which the travel of said diaphragm between said valve seat members is determined so that when the diaphragm is at one-half travel the total cross-sectional area of said annular clearance space and said passageways through which the fluid under pressure passes from said chamber into said fluid supply chamber is less than 75% of the total cross-sectional area of the passage through which said fluid under pressure enters said chamber from said inlet chamber.

6. The invention as defined in claim 3 in which said diaphragm is formed of an impregnated leather.

7. The invention as defined in claim 3 in which said diaphragm has a thickness ranging between about 1/64″ to 1/8″.

8. The invention as defined in claim 3 in which said diaphragm is formed of an impregnated leather having a thickness of 1/32″.

References Cited in the file of this patent
UNITED STATES PATENTS

| | | |
|---|---|---|
| 2,202,123 | Strode | May 28, 1940 |
| 2,223,944 | Roy | Dec. 3, 1940 |
| 2,761,463 | Wagner | Sept. 4, 1956 |
| 2,778,373 | Jaquith | Jan. 22, 1957 |
| 2,893,416 | Hegsted | July 7, 1959 |